United States Patent [19]

Miwa et al.

[11] Patent Number: 4,916,562

[45] Date of Patent: Apr. 10, 1990

[54] MAGNETIC DISK STORAGE EQUIPMENT

[75] Inventors: Takahiro Miwa; Yuji Kiyohara; Hiroshi Nishikawa; Eiji Tanaka, all of Nagoya, Japan

[73] Assignee: Brother Kogyo Kabushiki Kaisha, Nagoya, Japan

[21] Appl. No.: 324,998

[22] Filed: Mar. 17, 1989

Related U.S. Application Data

[63] Continuation of Ser. No. 925,249, Oct. 31, 1986, abandoned.

[30] Foreign Application Priority Data

Oct. 31, 1985 [JP] Japan .................................. 60-244731
Nov. 19, 1985 [JP] Japan .................................. 60-259140

[51] Int. Cl.$^4$ ............................................. G11B 5/596
[52] U.S. Cl. .............................. 360/77.06; 360/78.13; 360/77.04
[58] Field of Search .................... 360/75, 77.02, 77.06, 360/78.13, 77.04

[56] References Cited

U.S. PATENT DOCUMENTS

| | | | |
|---|---|---|---|
| 3,009,759 | 11/1961 | Johnson et al. ........................ | 360/78 |
| 3,649,753 | 3/1972 | Kiujo et al. ............................ | 360/78 |
| 3,950,783 | 4/1976 | Herring et al. ........................ | 360/78 |
| 4,445,153 | 4/1984 | Fujimoto et al. ..................... | 360/109 |
| 4,623,942 | 11/1986 | Kraus et al. ............................ | 360/75 |
| 4,626,942 | 12/1986 | Shoji et al. ............................. | 360/75 |
| 4,630,145 | 12/1986 | Thompson et al. .................... | 360/77 |
| 4,677,506 | 6/1987 | Kaneko et al. ......................... | 360/77 |

FOREIGN PATENT DOCUMENTS

| | | | |
|---|---|---|---|
| 0138202 | 4/1985 | European Pat. Off. .............. | 360/77 |
| 0152071 | 8/1985 | European Pat. Off. .............. | 360/75 |
| 47-35449 | 9/1972 | Japan .................................... | 360/75 |
| 0119216 | 9/1979 | Japan .................................... | 360/77 |

*Primary Examiner*—Aristotelis M. Psitos
*Assistant Examiner*—David L. Robertson
*Attorney, Agent, or Firm*—Cushman, Darby & Cushman

[57] ABSTRACT

Magnetic disc storage equipment for recording and reproducing signals on a magnetic disc comprising a carriage for shifting a magnetic head in a radial direction of the magnetic disc upon which is recorded signals on a respective divided sector of a track, a shifting bolt which is screwed with the carriage, a stepping motor which is interlocked with the shifting bolt and rotates the shifting bolt by a destined number of steps corresponding to a respective track gap to adjust the magnetic head at each track through the carriage, detecting means to detect signals which are read by the magnetic head at a desired track position, and shifting means to shift the magnetic head to an appropriate position based on the signals which are detected by the detecting means.

1 Claim, 11 Drawing Sheets

FIG. 6

| SCAN NO. | STEP POSITION |
|---|---|
| 3 | $-2/4$ |
| 2 | $-1/4$ |
| 0 | 0 |
| 1 | $+1/4$ |
| 4 | $+2/4$ |

FIG.12

| SCAN NO. | S1 | S2 | S3 | S4 | S5 | S6 | S7 |
|---|---|---|---|---|---|---|---|
| PULSE POSITION (TRACK) | $+3/4$ | $+2/4$ | $+1/4$ | 0 | $-1/4$ | $-2/4$ | $-3/4$ |
| CONTENT OF SCAN REGISTER | 1 | 2 | 3 | 4 | 5 | 6 | 7 |

FIG.13

| SECTOR NO. | 1 | 2 | 3 | 4 | 5 | 6 | 7 | 8 | 9 |
|---|---|---|---|---|---|---|---|---|---|
| IDENTIFIER READABLE FLAG | 0 | 1 | 1 | 1 | 1 | 1 | 0 | 0 | 0 |

MAGNETIC DISK STORAGE EQUIPMENT

This is a continuation of application Ser. No. 925,249, filed Oct. 31, 1986, which was abandoned upon the filing hereof.

BACKGROUND OF THE INVENTION

The present invention relates to magnetic disc storage equipment used in a connected manner with a computer, such as a personal computer.

Conventionally, a magnetic head of magnetic disc storage equipment is shifted to a desired track by an open-loop control. Therefore, high accuracy is needed in the shifting mechanism for shifting the magnetic head, and the cost reduction of the production is limited by the requirements of high accuracy. However, there is another type of conventional magnetic disc storage equipment in which the magnetic head is shifted to the desired track by a closed-loop control, but a feed-back circuit provision is required in such conventional magnetic disc storage equipment so that a lower cost is not realized.

SUMMARY OF THE INVENTION

An object of the invention is to provide magnetic disc storage equipment at a lower cost.

Another object of the invention is to provide magnetic disc storage equipment which can conveniently read and/or write data from a magnetic disc, even if the magnetic disc storage equipment has a low accuracy mechanism for shifting a magnetic head.

A further object of the invention is to provide magnetic disc storage equipment which can adjust a magnetic head to an appropriate position in a feed-back manner without a provision of a special feed-back circuit.

These objects and advantages are realized by magnetic disc storage equipment for recording and reproducing signals on a magnetic disc, comprising:

a magnetic head provided on a head carriage;

a shifting bolt which is operably screwed with the head carriage to shift the magnetic head in a radial direction of the magnetic disc, the magnetic disc having recorded thereon recorded data on a respective predetermined number of divided sectors on a track;

a stepping motor so interlocked with the shifting bolt that the magnetic head is shifted or sidestepped for one track gap of the magnetic disc by the rotations of the stepping motor in response to a plurality of pulses;

shift-commanding means for commanding to shift the magnetic head by the rotations of the stepping motor at pulse positions corresponding to at least one of a center track position and a neighborhood position within one track gap of the center track position;

detecting means for detecting signals which are read by the magnetic head at the pulse positions; and adjust-commanding means for commanding to adjust the magnetic head by rotations of the stepping motor at an appropriate position based on the signals detected by the detecting means, so as to execute one of a read and a write of the magnetic head.

Other and further objects, features and advantages of the invention will appear more fully from the following description.

BRIEF DESCRIPTION OF THE DRAWINGS

Figure 6:
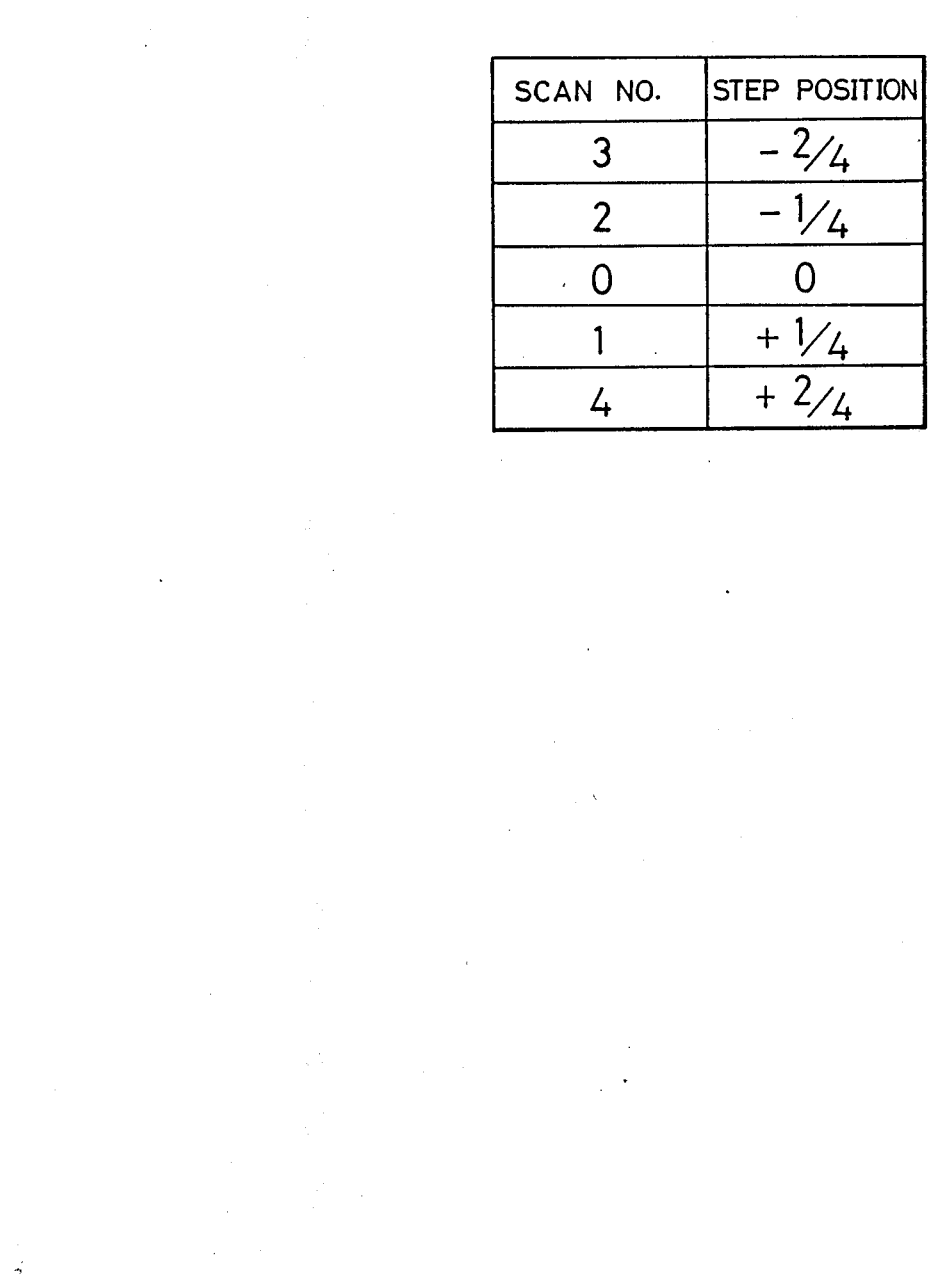

FIG. 1 to FIG. 6 are views to illustrate a first embodiment of the invention:

FIG. 1 is a perspective diagram illustrating a structure of a magnetic head shifting mechanism;

FIG. 2 is a block diagram illustrating magnetic disc storage equipment in accordance with the first embodiment;

FIG. 3 is a plan schematic view illustrating a magnetic disc;

FIG. 4 is a development explaining the recorded content in each sector of the magnetic disc;

FIG. 5 is a flow chart illustrating an operation state of the invention of the first embodiment; and FIG. 6 is a chart illustrating relations between scan numbers and step positions.

FIG. 7 to FIG. 13 are views to illustrate a second embodiment of the invention:

FIG. 7 is a graphical representation illustrating a distribution of sector numbers read by a magnetic head;

FIG. 8 is a block diagram of magnetic disc storage equipment in accordance with the second embodiment;

FIG. 9 is a development of the recorded content in each sector of the magnetic disc;

FIG. 10 is a plan schematic view of a magnetic disc;

FIG. 11 (a) is a flow chart of an operation state of the invention of the second embodiment;

FIG. 11 (b) is a flow chart of a check track subroutine;

FIG. 12 is a chart of a scan operation; and

FIG. 13 is a chart of the content of the sector flag register.

DETAILED DESCRIPTION OF THE PREFERRED EMBODIMENTS

First Embodiment

Referring now to FIGS. 1-6, a first embodiment of the invention is described.

Figure 1:
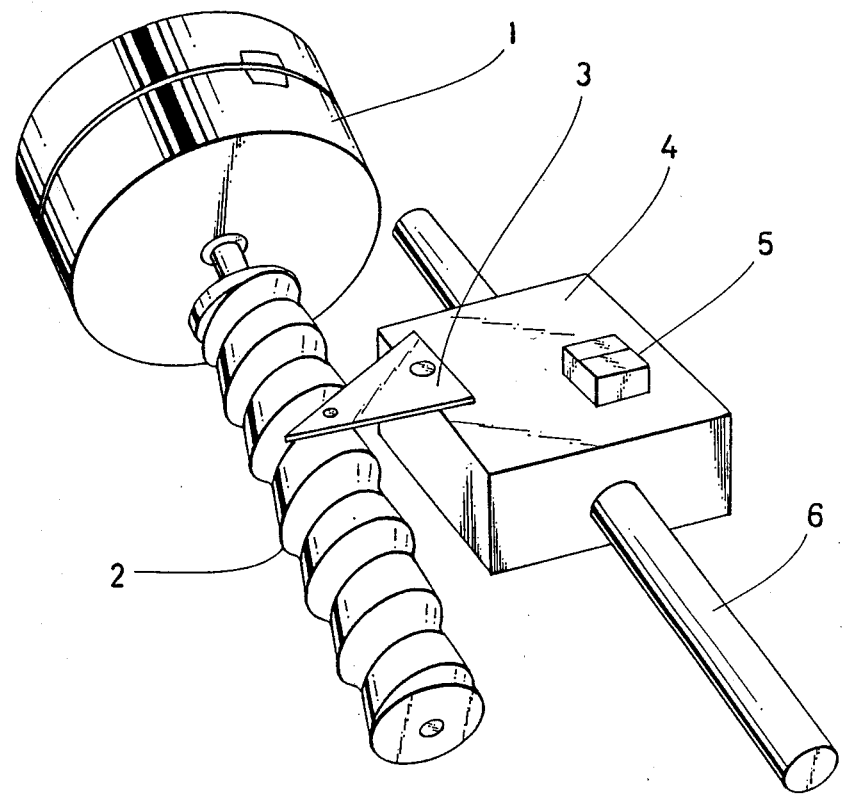
Figure 2:
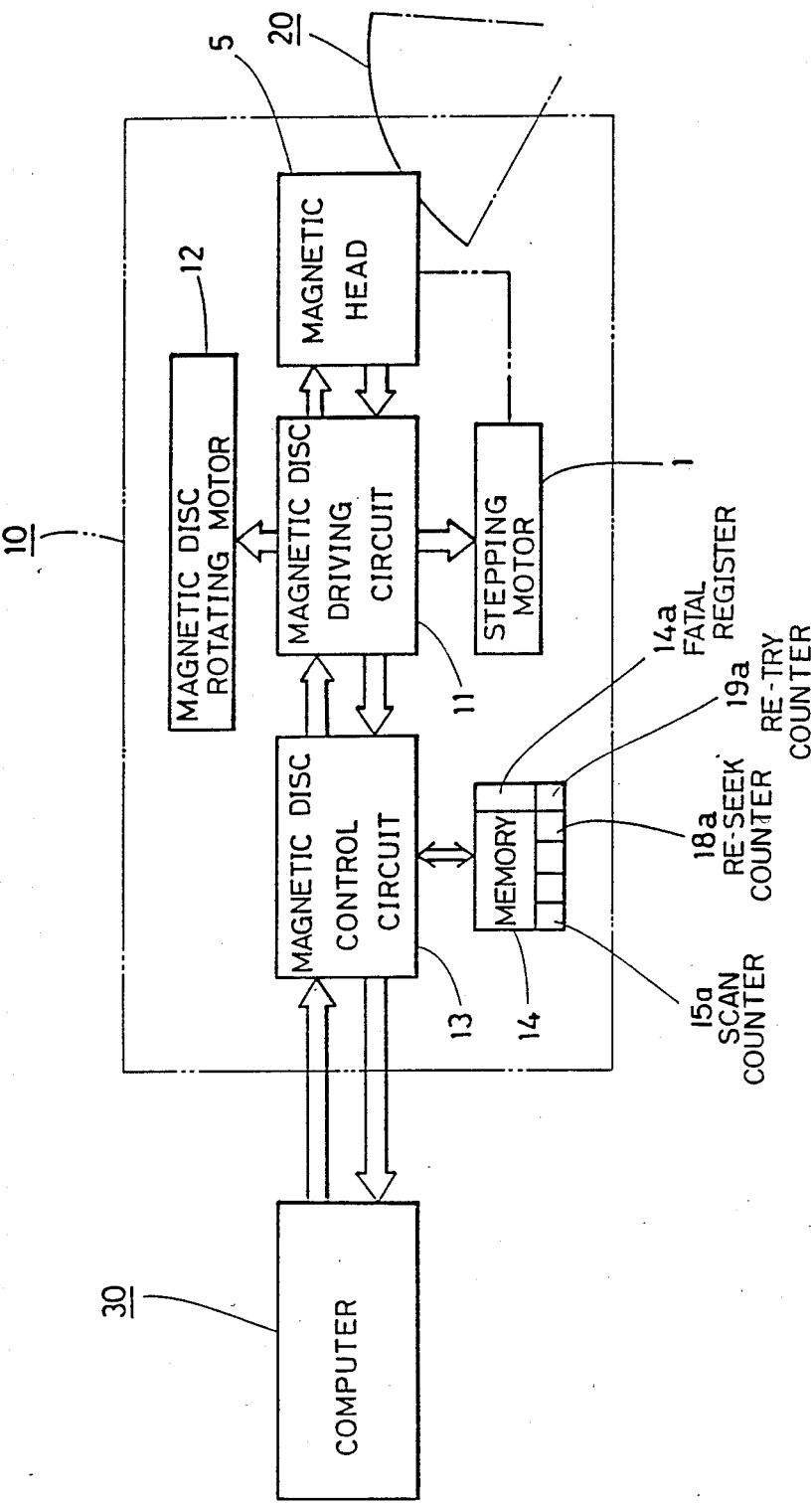

As shown in FIG. 1 and FIG. 2, magnetic disc storage equipment 10 is constructed as a shifting bolt 2 molded by synthetic resin which is fixedly connected with a shaft of a stepping motor 1 for shifting a head carriage 4 axially along a supporting bar 6 through a shifting spring 3 upon a rotation movement of the shifting bolt 2. In this manner, a magnetic head 5 of the single gap type provided on the head carriage 4 is shifted by the stepping motor 1 to a desired position on a magnetic disc 20.

Figure 3:
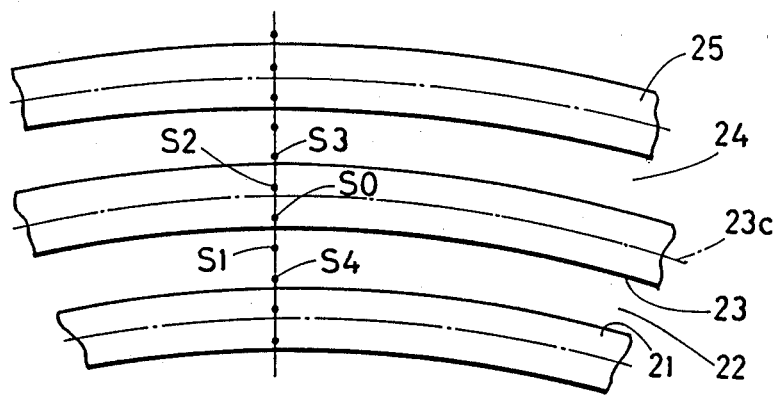

As shown in FIG. 3, it is important that the stepping motor 1 and the shifting bolt 2 are designed so that the magnetic head 5 is shifted for one track gap of the magnetic disc 20 by the rotations of the stepping motor corresponding to more than two (2) pulses. In the first embodiment, the stepping motor 1 and the shifting bolt 2 are designed so that four (4) pulse rotations of the stepping motor 1 correspond to one track gap of the magnetic head 5.

As shown in FIG. 2, a magnetic disc driving circuit 11, a magnetic disc rotating motor 12, and a magnetic disc control circuit 13 are also provided in magnetic disc storage equipment 10 in addition to the stepping motor 1 and magnetic head 5. The magnetic disc driving circuit 11 may start and stop the stepping motor 1 and the magnetic disc rotating motor 12 based on a command signal from the magnetic disc control circuit 13 and may change a rotation direction of both motors.

The magnetic disc driving circuit 11 also may make the magnetic head 5 operate for recording, reproducing or erasing action. The magnetic disc control circuit 13, on the other hand, is connected with a computer 30 such as a personal computer. Moreover, the magnetic disc control circuit 13 is also connected with memory 14 which has a register area (not shown) which stores a control program to control the operation of the magnetic disc storage equipment 10 and has a register area 14a, 15a, 18a and 19a to store various data. The register area 14a is a fatal register, the area 15a is a scan counter, the area 18a is a re-seek counter, and the area 19a is a re-try counter.

During operation, the control program stored in the memory 14 is read in the computer 30 connected with the magnetic disc control circuit 13, and then required command information is transmitted from the computer 30 to the magnetic disc control circuit 13 when the control program is executed by the computer 30, whereupon the magnetic disc driving circuit 11 is controlled by the magnetic disc control circuit 13 based on the command information from the computer 30. The magnetic disc storage equipment 10 thus is operated to record and regenerate information to the magnetic disc 20 through the magnetic head 5 and to erase any unnecessary information stored on the magnetic disc 20.

In the embodiment of the invention seen in FIG. 2, although the computer 30 is a so-called personal computer which is connected with the magnetic disc storage equipment 10 so as to read the control program stored in the memory 14 for controlling the magnetic disc storage equipment 10 and directly outputs the command signal to the magnetic disc control circuit 13, the embodiment can be modified such that another computer is provided in the magnetic disc storage equipment 10, where the computer 30 as host computer is connected with the magnetic disc control circuit 13 via the other computer in order to operate the other computer in the magnetic disc storage equipment 10 in accordance with the control program stored in the memory 14 upon receipt of a command from the computer 30.

Figure 4:
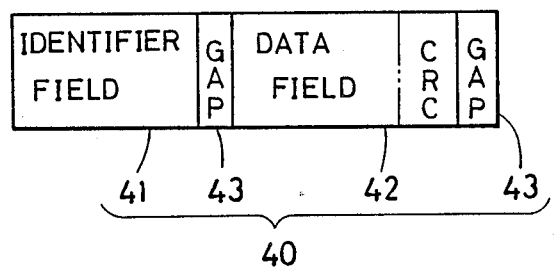

As seen in FIG. 3, the magnetic disc 20 provides many tracks 21, 22, 23, 24, 25 which are concentrically disposed, wherein the tracks 21, 23, 25 are tracks for writing, while the tracks 22, 24 are tracks for erasing. The tracks for writing 21, 23, 25 are respectively divided into many sectors 40 for recording information. In the first embodiment, each track is divided into nine sectors (now shown). The tracks for erasing 22, 24 are the separatory zones for which the information of the writing tracks 21, 23, 25 are not mixed. As shown in FIG. 4, for example, the sector 40 has both an identifier field 41 which is recorded information to give a start and an address of the sector and a data field 42 for recording data. The data field 42 provides an area in which is written a cyclic redundancy code CRC, in addition to the area wherein data is written. The CRC is a kind of error correcting code, so the length and the contents of data are written in the CRC area by the ruled byte numbers. Between the identifier field 41 and the data field 42 there is provided a gap digit 43 to protect the data from a rotation fluctuation and an error of mechanical tolerance or a lag of an erase gate and an error of timing, etc.

According to the first embodiment, information recorded in an aimed track will be read by the magnetic head shifting mechanism regardless of its low accuracy, whether there is an error between a track center shown by a dotted chain line 23C in FIG. 3 and a position of the magnetic head 5 shifted by the stepping motor 1 or not, as explained below. The computer 30 reads the control program which is recorded in the memory 14 and shown as a flowchart in FIG. 5 and transmits the command signal to the magnetic disc control circuit 13. When the magnetic head 5 is shifted to an aimed pulse position by the stepping motor 1 for a reading, however, a case my happen in which a correct read cannot be made due to a position difference of the magnetic head 5 from the aimed position, caused by an error of the shifting bolt 2 itself or a fitting error for the stepping motor 1. However, for the embodiment at that case, the magnetic head 5 is scanned to a positive side and a negative side in the limit of 4 pulses by the stepping motor 1 as shown in FIG. 6, thereby reading a destined number of CRC data of the sector 40 in the aimed track.

OPERATION OF THE FIRST EMBODIMENT

Figure 5:
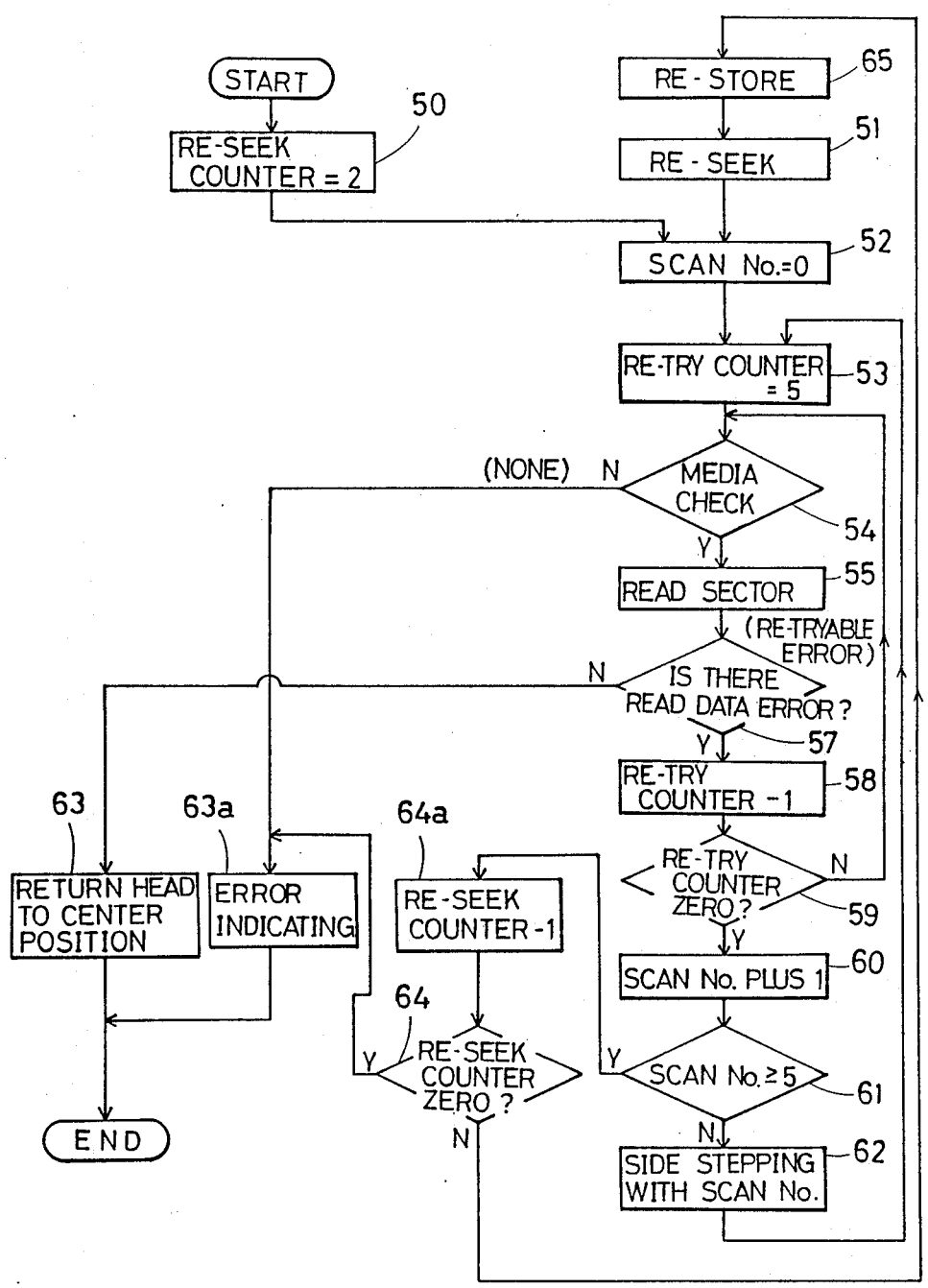

When the computer 30 is operated, at a step 50 of the program shown in FIG. 5, the re-seek counter 18a is set at a numeral value 2 for deciding the number of shift times of the magnetic head 5 to a desired track. This numeral value is decremented by one once the magnetic head 5 is shifted to the desired track. At a step 52, the magnetic head 5 is shifted by the stepping motor 1 to a pulse position corresponding to the desired track position, such as a position SO when the scan number equals zero as shown in FIG. 3. At a step 53, the re-try counter 19a is set to five. At a step 54, an insertion of the magnetic disc 20 as an intended media to the magnetic disc storage equipment 10 is checked, and if the insertion is confirmed, then a step 55 is executed. At the step 55, a read is executed for reading the sectors in the pulse position of which the scan number equals zero.

Next, at a step 57, the read data is checked for whether or not the read data is correct data including the CRC, and if the checked result is YES, one is subtracted from the re-try counter 19a in a step 58 before a step 59 is executed. At the step 59, whether or not the content of the retry counter 19a is zero is checked. In the first embodiment as described, the re-try counter is now four so the execution is returned to the step 54. Then the execution of step 54 to step 58 is repeated. After the re-try is repeated five times, i.e., when the check result in the step 59 becomes YES, one is added to the scan number at a step 60. Then, at a step 61, the scan number is checked for whether or not it is greater than 5, and then a step 62 is performed because the check result is NO, since the scan number is one (1) in the embodiment. At the step 62, the magnetic head 5 is sidestepped for 1 pulse distance to the S1 position as shown in FIG. 3 when the scan number equals 1. The program then is returned to the step 53 and the number 5 is loaded into the re-try counter. The procedures of step 54 to step 59 are further repeated, and then the scan number is increased to the number 2 at step 60 and step 62 is one more performed via the step 61. At the step 62, the magnetic head 5 is shifted to the position S2 in FIG. 3 according to the scan number, which at this time equals 2. Thus, the procedures of step 53 to step 62 are repeated, and when the magnetic head 5 is shifted by the procedure of step 62 to the position S2 in FIG. 3, the destined number of CRC data in the sector 40 may be read by the magnetic head 5. If the check result in the step 57 results in NO error, the read data are transmitted to the computer 30 and the magnetic head 5 is returned to a center position of the magnetic disc at a step 63. The program then is ended.

When the procedures of the step 53 to the step 62 are repeating, whether the scan number becomes 5 or more is checked at the step 61, the re-seek counter is counted down at a step 64a, and the subtracted result is checked at a next step 64. If the check result is NO, a step 65 is performed, and the magnetic head is re-stored by shifting it to a track 0 (not shown) at the outer periphery of the magnetic disc. At a next step 51, a re-seek is executed, and the magnetic head 5 is shifted to the pulse position in accordance with the same aimed position. Then, the second seek is performed in the same manner as described above. However, at this time, if the check result at the step 64 is YES, the magnetic disc storage equipment 10 may still have inferior data; therefore, an error indication is executed by a step 63a. The program then is ended.

ADVANTAGE OF THE FIRST EMBODIMENT

As described above, the magnetic disc storage equipment of the first embodiment has detecting means and shift-commanding means which utilize the computer; therefore, the magnetic disc is successfully read in a feed-back control manner even if a magnetic disc shifting mechanism does not have a very high accuracy, thereby causing a superior advantage to be attained for designing magnetic disc storage equipment at a lower cost.

Second Embodiment

Referring now to FIGS. 7-13, a second embodiment of the invention is described.

Figure 8:
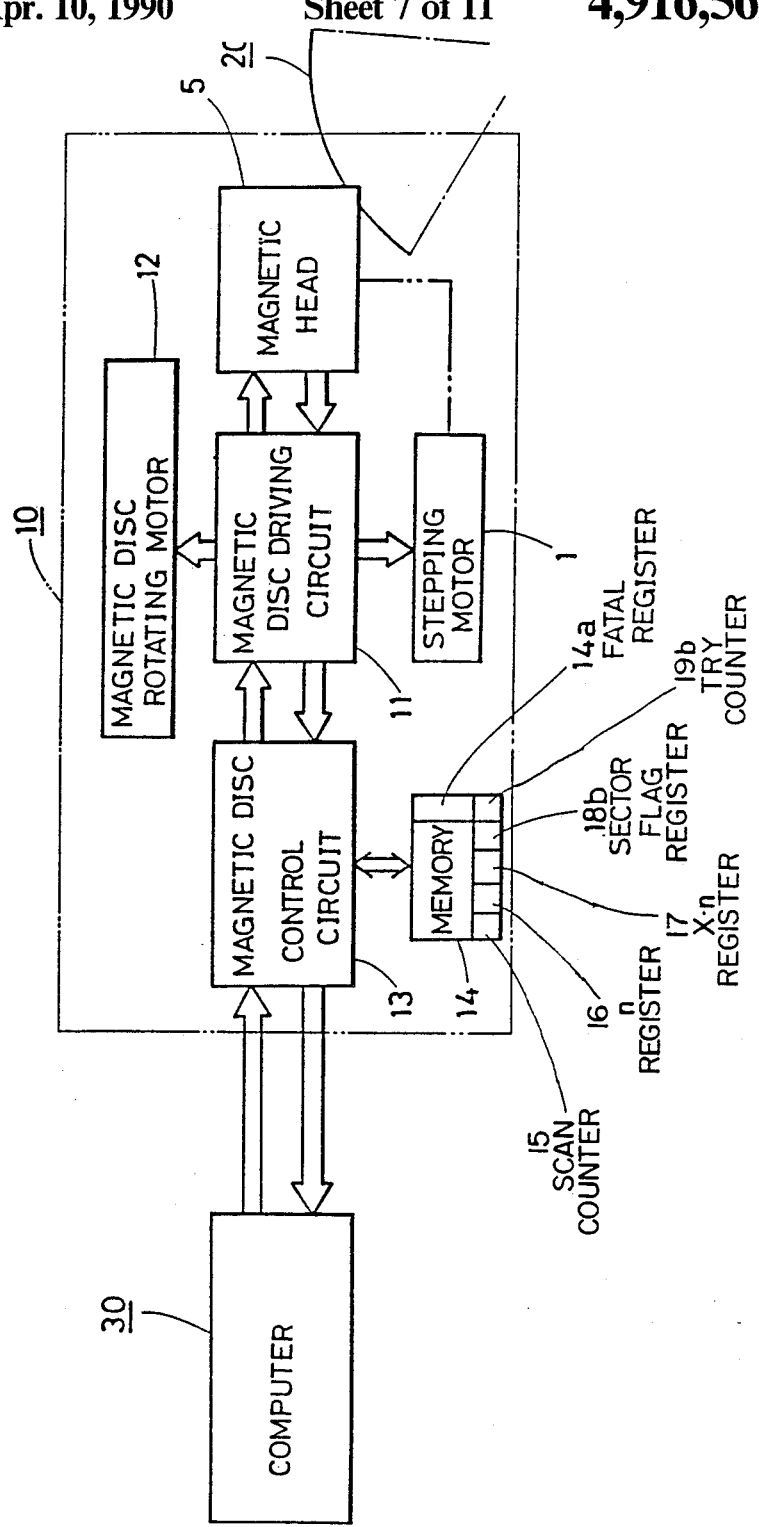

As shown in FIG. 8 and FIG. 1 of the first embodiment, magnetic disc storage equipment 10 is constructed as a shifting bolt 2 molded by synthetic resin which is fixedly connected with a shaft of a stepping motor 1 for shifting a head carriage 4 axially along a supporting bar 6 through a shifting spring 3 upon a rotation movement of the shifting bolt 2. In this manner, magnetic head 5 of the single gap type provided on the head carriage 4 is shifted by the stepping motor 1 to a desired position on a magnetic disc 20.

Figure 10:
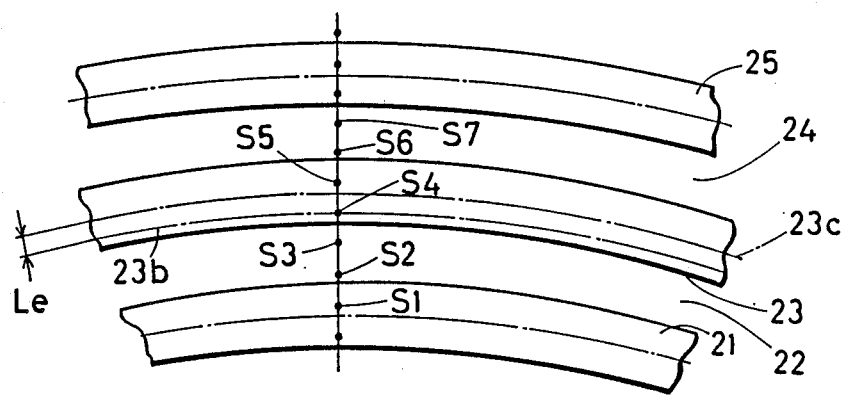

As shown in FIG. 10, it is important that the stepping motor 1 and the shifting bolt 2 are designed so that the magnetic head 5 is shifted for one track gap of the magnetic disc 20 by the rotations of the stepping motor corresponding to more than two (2) pulses. In the second embodiment, the stepping motor 1 and the shifting bolt 2 are designed so that four (4) pulse rotations of the stepping motor 1 correspond to one track gap of the magnetic head 5.

As shown in FIG. 8, a magnetic disc driving circuit 11, a magnetic disc rotating motor 12, and a magnetic disc control circuit 13 are also provided in magnetic disc storage equipment 10 in addition to the stepping motor 1 and magnetic head 5. The magnetic disc driving circuit 11 may start and stop the stepping motor 1 and the magnetic disc rotating motor 12 based on a command signal from the magnetic disc control circuit 13 and may change a rotation direction of both motors. The magnetic disc driving circuit 11 also may make the magnetic head 5 operate for recording, reproducing or erasing action. The magnetic disc control circuit 13, on the other hand, is connected with a computer 30 such as a personal computer. Moreover, the magnetic disc control circuit 13 is also connected with a memory 14 which has a register area (not shown) which stores a control program to control the operation of the magnetic disc storage equipment 10 and has a register area 14a, 15, 16, 17, 18b and 19b to store various data. The register area 14a is a fatal register, the area 15 is a scan counter, the area 16 is a $\Sigma n$ register, the area 17 is a $\Sigma x.n$ register, the area 18b is a sector flag register, and the area 19b is a try counter.

During operation, the control program stored in the memory 14 is read in the computer 30 connected with the magnetic disc control circuit 13, and then required command information is transmitted from the computer 30 to the magnetic disc control circuit 13 when the control program is executed by the computer 30, whereupon the magnetic disc driving circuit 11 is controlled by the magnetic disc control circuit 13 based on the command information from the computer 30. The magnetic disc storage equipment 10 thus is operated to record and regenerate information to the magnetic disc 20 through the magnetic head 5 and to erase any unnecessary information stored on the magnetic disc 20.

In the second embodiment of the invention seen in FIG. 8, although the computer 30 is a so-called personal computer which is connected with the magnetic disc storage equipment 10 so as to read the control program stored in the memory 14 for controlling the magnetic disc storage equipment 10 and directly outputs the command signal to the magnetic disc control circuit 13, the embodiment can be modified such that another computer is provided in the magnetic disc storage equipment 10, where the computer 30 as a host computer is connected with the magnetic disc control circuit 13 via the other computer in order to operate the other computer in the magnetic disc storage equipment 10 in accordance with the control program stored in the memory 14 upon receipt of a command from the computer 30.

Figure 9:
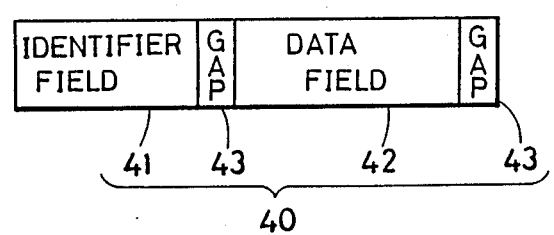

As seen in FIG. 10, the magnetic disc 20 provides many tracks 21, 22, 23, 24, 25 which are concentrically disposed, wherein the tracks 21, 23, 25 are tracks for writing, while the tracks 22, 24 are tracks for erasing. The tracks for writing 21, 23, 25 are respectively divided into the predetermined number of sectors 40 for recording information. In the second embodiment, each track is divided into nine sectors (not shown). The tracks for erasing 22, 24 are separatory zones for the information which is recorded on the tracks for writing 21, 23, 25. As shown in FIG. 9, for example, the sector 40 has both an identifier field 41 for which is recorded information to give a start and an address of the sector and a data field 42 for recording data. Between the identifier field 41 and the data field 42 there is provided a gap digit 43 for protecting the data from both a rotation fluctuation and a mechanical error of tolerance, or a lag of an erase gate and a timing error, etc.

In the identifier field 41, identifier information having a destined byte number is written in as a signal which has two kinds of magnetic direction. When the magnetic head 5 is shifted to a normal track position, the identifier information of all sectors in the track is readable, but if there is an error between the normal track position and the position of the magnetic head 5 which is shifted by the stepping motor 1, the inventors of the present invention have found by experiment that the number of sector 40 of which the identifier information is readable is gradually decreased if the error is increased.

According to the second embodiment, an error between a track center position shown by a dotted chain line 23C in FIG. 10 and a position of the magnetic head 5 which is shifted by the stepping motor 1 can be decreased, as explained below. The computer 30 reads the control program which is shown as the flowcharts in FIG. 11 (a) and FIG. 11 (b) from the memory 14, and it transmits a command signal to the magnetic disc control circuit 13. In the second embodiment, the programs of both of FIG. 11 (a) and FIG. 11 (b) are executed when the magnetic head is shifted to each track, and when a pulse position which can shift the magnetic head 5 with a minimum error to the regular track position is seeked, and the magnetic head 5 is shifted at the seeked pulse position within the minimum error, a feed-back control is made possible without a provision of a special feed-back circuit.

OPERATION OF THE SECOND EMBODIMENT

There is an error Le between the track center position in which information is recorded as shown in FIG. 10 by the dotted chain line 23C, and a position of the magnetic head 5 which is shifted by the stepping motor 1 is also shown in FIG. 10 by a dotted chain line 23C as described above. In order to minimize the error, the second embodiment's device operates in the following manner.

Figure 7:
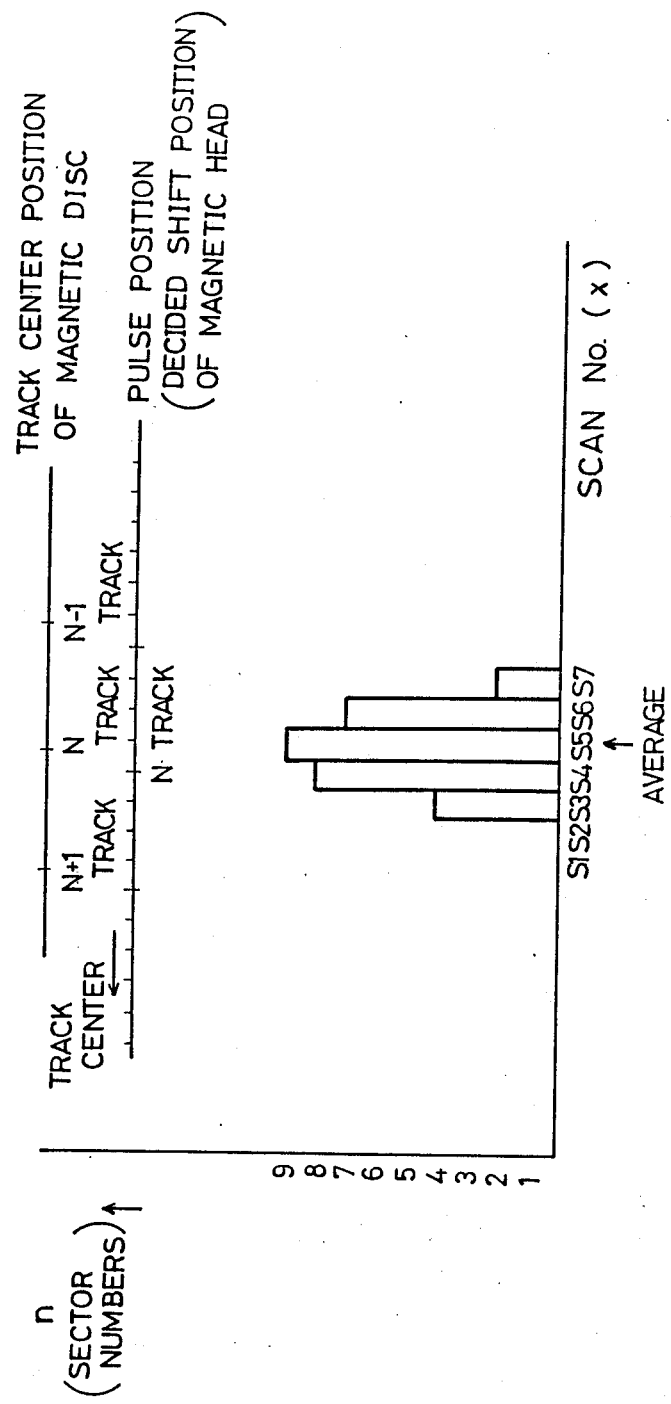
Figure 11A:
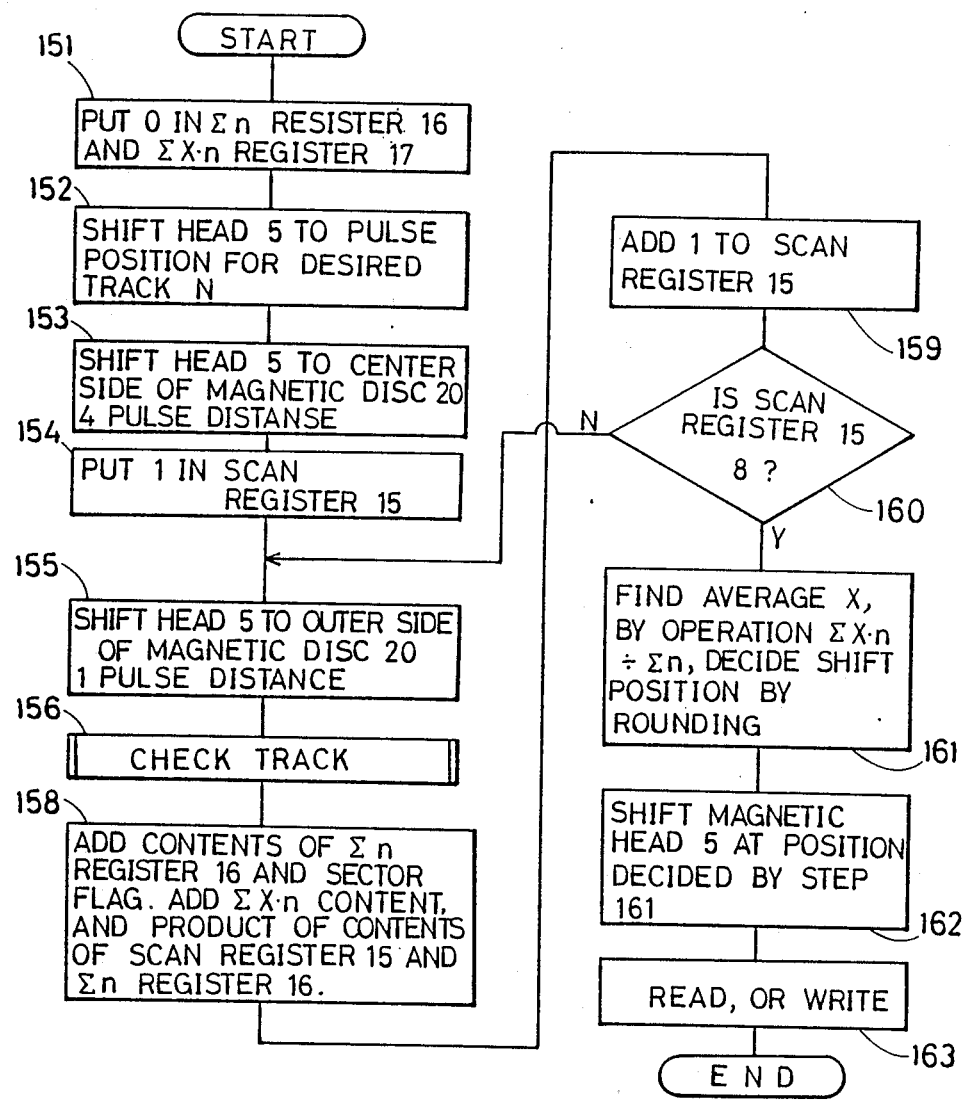
Figure 11:
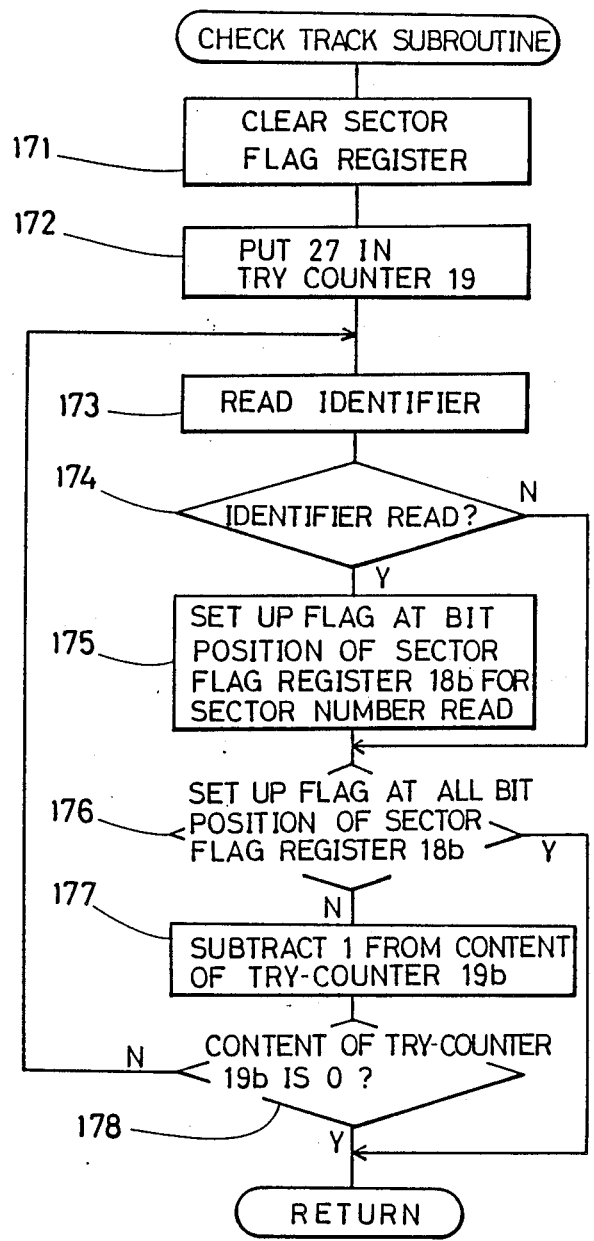

In accordance with the flow-chart shown in FIG. 11 (a), the magnetic head 5 is seeked by the stepping motor 1 first to a step position corresponding to an aimed track 21, and after that, the magnetic head 5 is shifted by order of a scan number shown in FIG. 12 from an inner periphery to an outer periphery of the magnetic disc 20 and a sector number which is read by the magnetic head 5 in each pulse position is totaled. As a result, a distribution seen in FIG. 7 is obtained, and the sector numbers which are read by the magnetic head 5 are decreased more so that the magnetic head is deviated more from the track center position of the magnetic disc in which the information is recorded. However, when the magnetic head 5 is shifted at an average pulse position as shown in FIG. 7, the error between the regular track position and the position of the magnetic head 5 which is shifted by the stepping motor 1 aimed at number of pulses can be minimized.

Further, the embodiment is explained in connection with the flow-chart shown in FIG. 11 (a) and FIG. 11 (b). At a step 151, the Σn register 16 and Σx.n register 17 are cleared, and at a next step 152, the magnetic h(R)ad 5 is shifted to the pulse position S4 of FIG. 10 which corresponds to a position of a desired track N which corresponds to a track 23. At a step 153, the magnetic head 5 is shifted to a center side of the magnetic disc 20 by four pulse distances. At a step 154, a scan number of one time is put in the scan register 15 in the memory 14, and a step 155 is performed. At the step 155, the magnetic head 5 is shifted to an outer side of the magnetic disc 20 by one pulse distance, and, in turn, the magnetic head 5 is shifted to a pulse position S1 of FIG. 10 at the first time. On and after the second time, the magnetic head 5 is shifted to a position corresponding to the scan number of times. Next, a check track sub-routine of a step 156 is executed.

In the check track sub-routine as shown in FIG. 11 (b), the sector flag register 18b in the memory 14 is cleared at a step 171 first, and at a step 172 thereafter, and the numeral 27 is put in the try counter 19b in the memory 14 in order for the identifier field of nine sectors per track to be read a maximum of three times by the magnetic head 5. At a step 173, one identifier field in a track is read. At a next step 174, the data which is read from the identifier field with its address is checked for whether the data correctly corresponds to one of the sectors in the seeked track 23. If the checked result is YES, a step 175 is performed, but a step 176 is performed if the result is NO. For example, if data in a neighbor track is read at the step 173, the checked result of the step 174 is NO and the step 176 is performed because the read data is different from the data which should be written in the sectors of a seeked track.

At the step 175, the read sector is memorized in the sector flag register 18b of the memory 14. As shown in FIG. 13, the sector flag register 18b has an area of nine bits which corresponds to each sector position of the track, wherein a flag "1" is set up at the bit positions corresponding to the read sector numbers. At the next step 176, the sector flag register 18b is checked for whether the flag is set at all of the bit positions in the register. If the result is YES, the check track sub-routine 156 is passed through, and a step 158 is performed, whereas if the result is NO, a step 177 is performed.

At the step 177, the content of the try counter 19b is decremented by one, and at a next step 178, the content of the try counter 19b is checked for whether or not it is zero. If the checked result is YES, the check track sub-routine is passed through. If the result is NO, the program is returned to the step 173, wherein the data of the next identifier is read, and the step 174 is performed.

Referring back to FIG. 11 (a), at a step 158, a number of flags which is set up in the sector flag register 18b is counted, and the number of flags is added to the content of the Σn register 16. The product of the flag numbers multiplied by the contents of the scan register 15 is added to the content of the Σx.n register 17.

At a next step 159, the number 1 is added to the scan register 15. At a step 160, the sum is checked for whether or not it has reached the number 8. If the sum has not reached the number 8, the program is returned to the step 155, wherein the magnetic head 20 is radially shifted by one pulse distance and a readable sector number in the next pulse position is counted. When the sum which is the content of the scan register 15 has reached the number 8, the check result of the step 160 will be YES. Then, at a step 161, an average number is found by an operation which divides the content of the Σx.n register by the content of the Σn register, and a shift position is decided by rounding the average number to the nearest whole number. At a next step 162, the magnetic head 5 is adjusted to the decided shift position.

For example, if the procedure from step 155 to step 159 is executed, when the sector numbers of the identifier fields as shown in FIG. 7 are found, then the sum of numbers 4+8+9+7+2 equal to the number 30 is memorized in the Σn register 16, and the sum of the products $(4 \times 3)+(8 \times 4)+(9 \times 5)+(7 \times 6)+(2 \times 7)$ equal to the number 145 is memorized in the Σx.n register 17. Therefore, the average number as the quotient $145 \div 30$ equal to the number 4.8 is found at the step 161. Thereafter, the average position number 5 is found by rounding the average value thereof at the step 161, and then at the step 162 the magnetic head 5 is adjusted at the position S5 in accordance with the result at the step 161. At a step 163, signals are read out or written in a desired identifier field.

ADVANTAGE OF THE SECOND EMBODIMENT

As described above, the magnetic disc storage equipment of the second embodiment provides the detecting means for the sector numbers and the adjust-commanding means for the magnetic head both of which utilize the computer. Therefore, a superior advantage is attained that the magnetic head is usually adjusted at a position where the maximum number of sectors can be read without a special feed-back control circuit using a magnetic disc shifting mechanism having not such high accuracy as required in the prior art.

What is claimed is:

1. Magnetic disc storage equipment for recording and reproducing signals on a magnetic disc, comprising:
    a magnetic head provided on a head carriage;
    a shifting bolt which is operably screwed with the head carriage to shift the magnetic head in a radial direction of the magnetic disc, said magnetic disc having recorded thereon recorded data on a respective predetermined number of divided sectors on a track;
    a stepping motor so interlocked with the shifting bolt that the magnetic head is shifted or sidestepped for one track gap of the magnetic disc by the rotations of the stepping motor in response to a plurality of pulses;
    shift-commanding means for commanding to shift the magnetic head to a first position which is seeked by rotations of the stepping motor by a number of steps corresponding to a desired track position, and to plural positions which are seeked by rotations of the stepping motor by a number of steps which are determined by said plurality of pulses corresponding to one track gap off both sides from said first position;
    detecting means for detecting a number of sectors which are read by the magnetic head at said first position and at said plural positions together with scan numbers of the readable sectors;
    averaging means for averaging the number of sectors detected by the detecting means and selecting an average position; and
    adjust-commanding means for commanding to adjust the position of the magnetic head to said average position by rotations of the stepping motor for a write by the magnetic head.

* * * * *